United States Patent

[11] 3,556,148

[72] Inventor Peter J. Bily
 Sunset Beach, Calif.
[21] Appl. No. 744,172
[22] Filed July 11, 1968
[45] Patented Jan. 19, 1971
[73] Assignee FMC Corporation
 San Jose, Calif.
 a corporation of Delaware

[54] DOUBLE COUNTERBALANCED MARINE LOADING ARM
 22 Claims, 10 Drawing Figs.
[52] U.S. Cl. ................................................. 137/615
[51] Int. Cl. ................................................. F16l 3/00,
 F16l 31/00
[50] Field of Search ................................. 137/615;
 248/292, 297; 222/48, 49; 214/14; 212/58;
 254/146A; 141/387, 388; 285/16, 122

[56] References Cited
 UNITED STATES PATENTS
 2,501,638 3/1950 Warren ........................ 285/122
 3,073,343 1/1963 Mowell ......................... 141/387
 3,434,491 3/1969 Bily ............................. 137/615
 3,454,259 7/1969 Faulkner ....................... 254/144

Primary Examiner—M. Cary Nelson
Assistant Examiner—William H. Wright
Attorneys—F. W. Anderson and C. E. Tripp ABSTRACT: A fluid-transferring apparatus of the double counterbalanced marine loading arm type, including an inboard arm section mounted upon an upstanding riser section for pivotal movement about a first generally horizontal axis and a generally vertical axis, an outboard arm section connected to the inboard arm section for pivotal movement about a second generally horizontal axis, a primary system for counterbalancing both inboard and outboard arm sections about the first generally horizontal axis, a secondary system of the pantograph type with sheaves, chains and rods for counterbalancing the outboard arm section about the second generally horizontal axis, a support and guide system for the pantograph chains and rods, and removable elements in the arm and riser sections for providing access to the packings of the swivel joint couplings between these sections without having to disconnect these sections from each other.

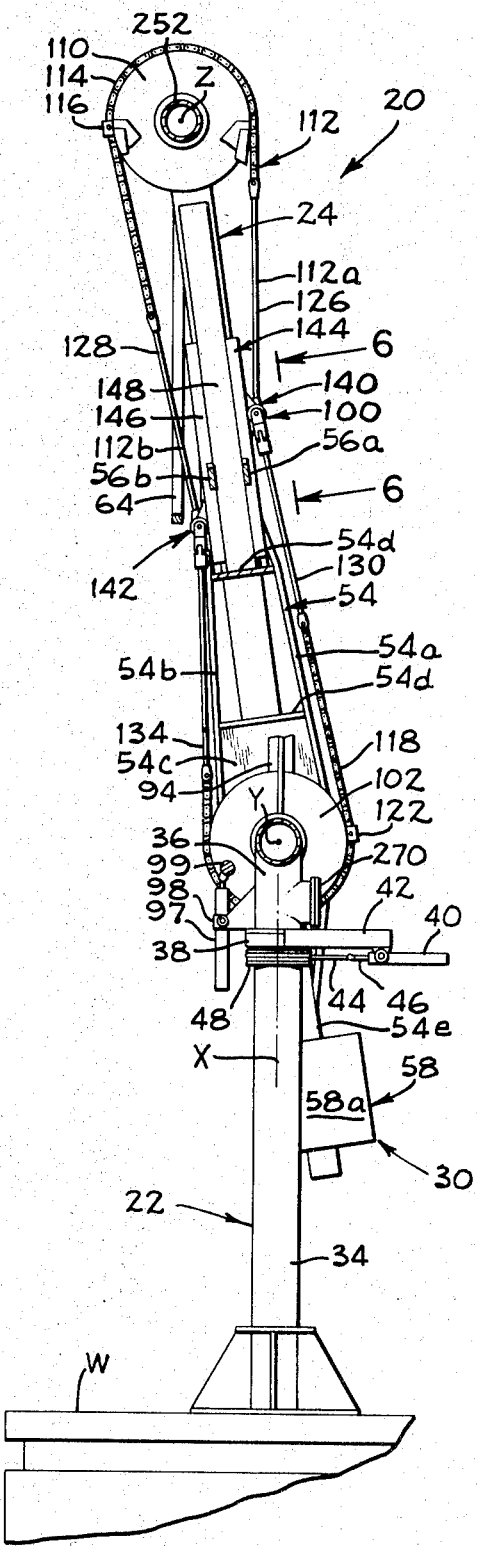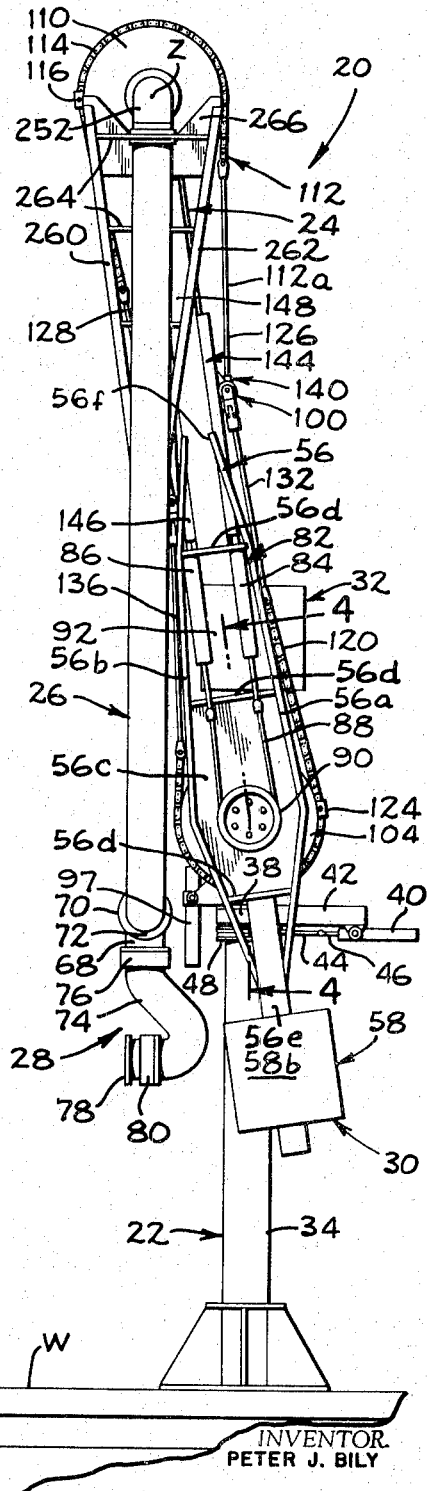

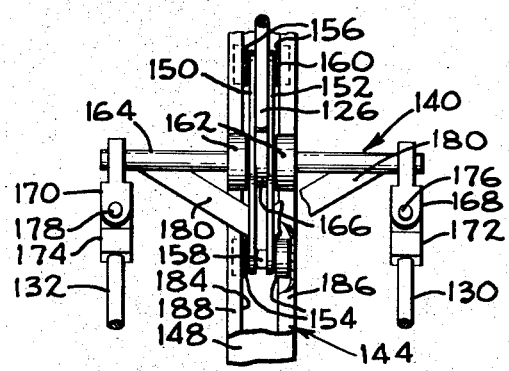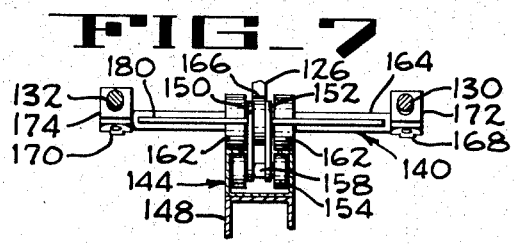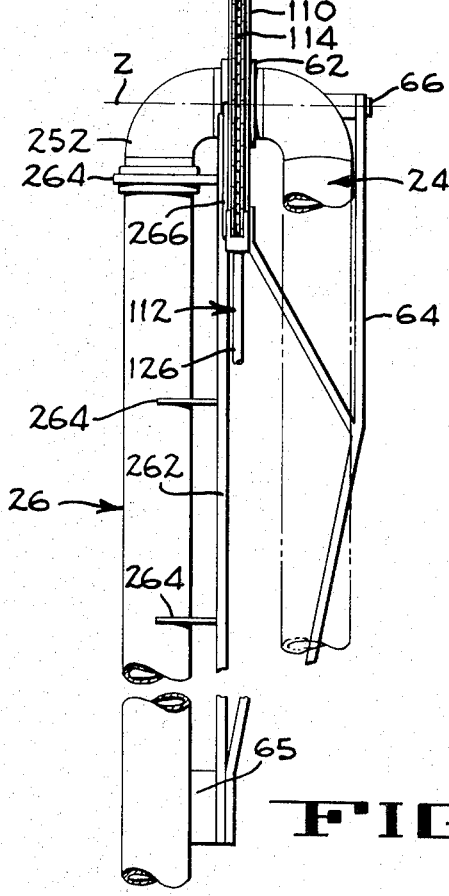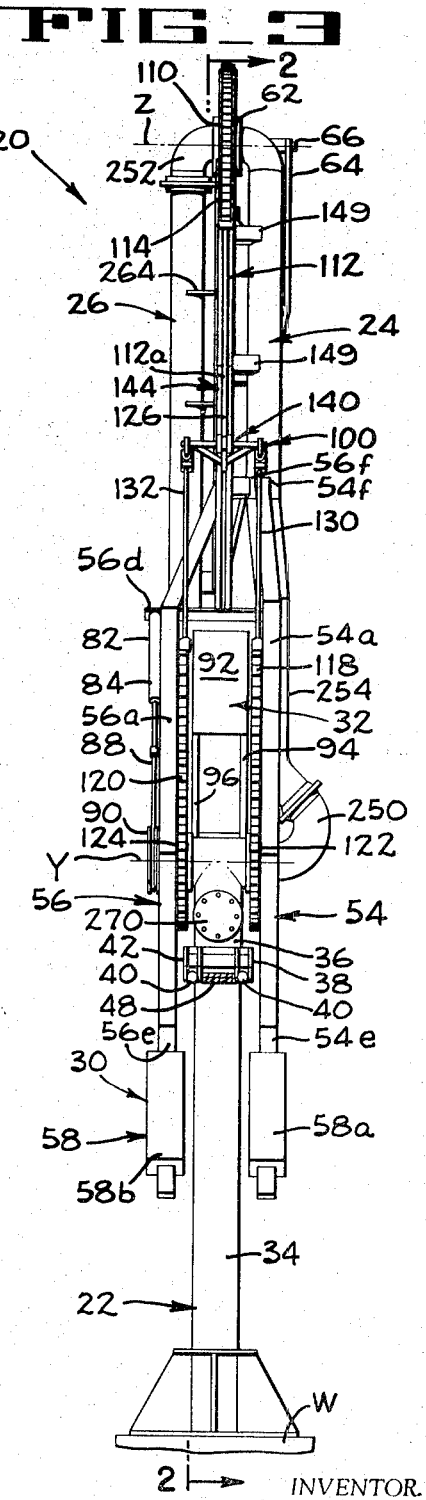

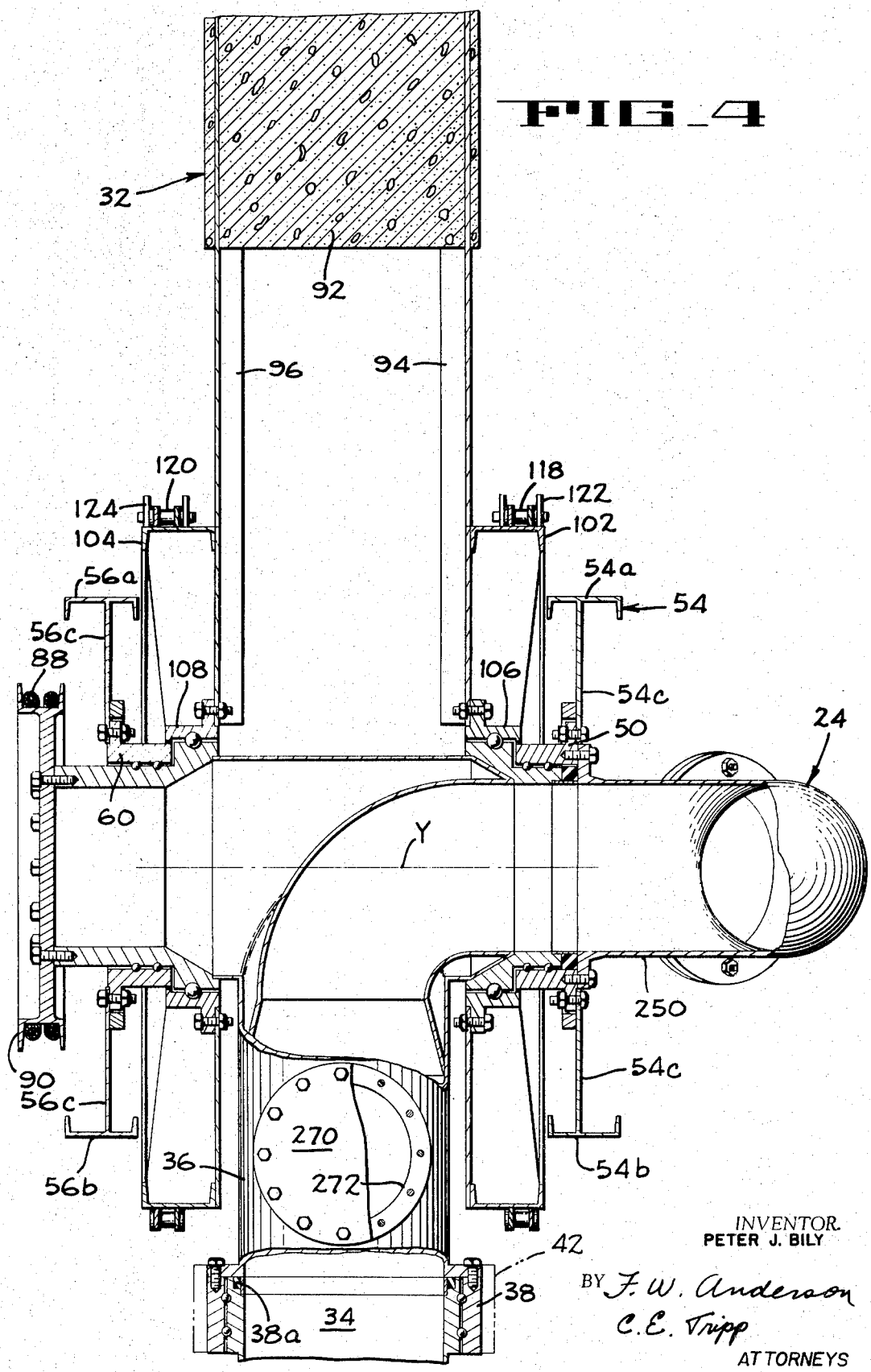

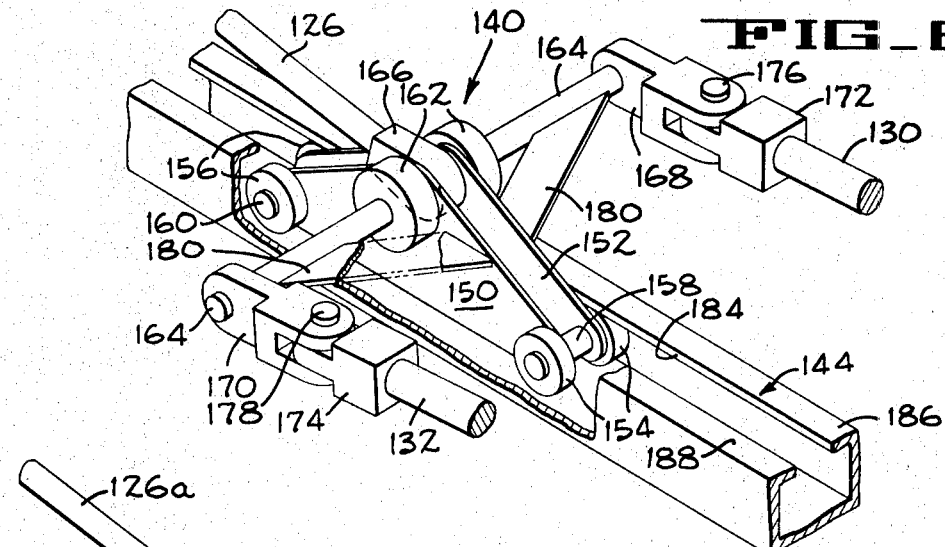
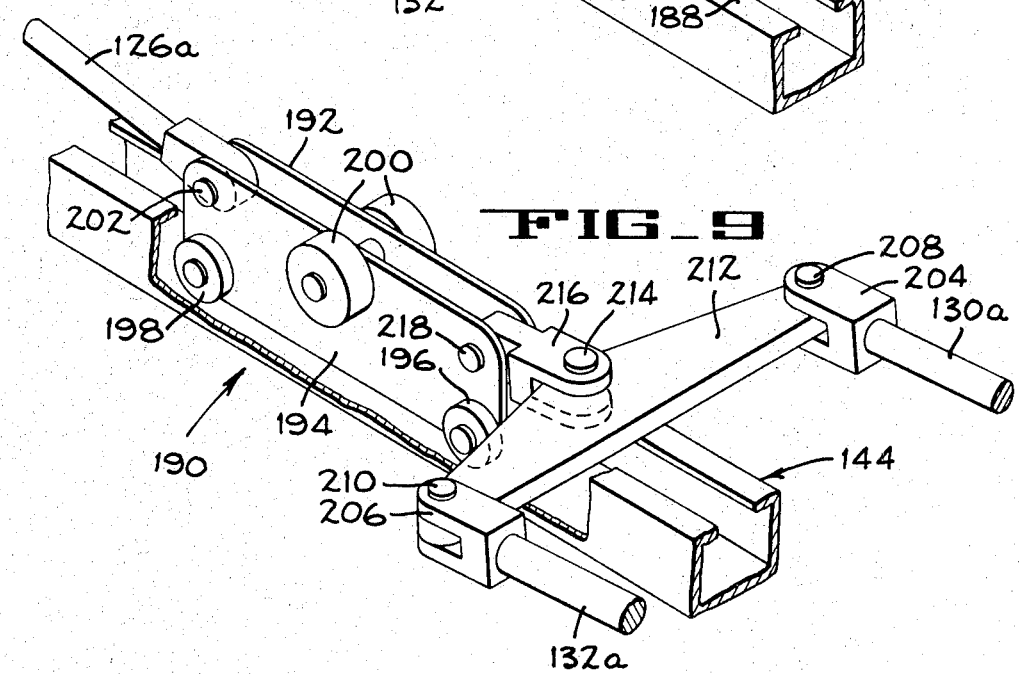
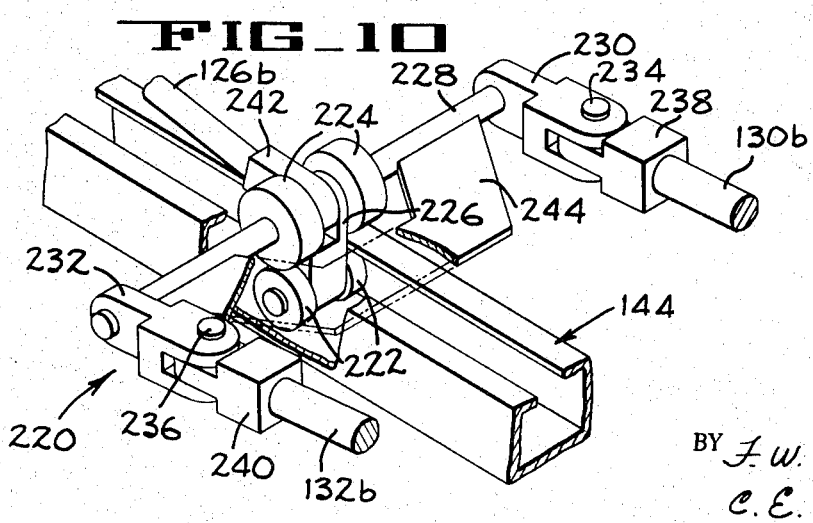

DOUBLE COUNTERBALANCED MARINE LOADING ARM

BACKGROUND OF THE INVENTION

The field of art to which the present invention pertains includes marine loading arms for transferring fluid, such as petroleum or petroleum products, between a wharf and a marine tanker or other floating vessel. More specifically, this invention involves that field of art relating to double counterbalanced marine loading arms with replaceable swivel joint packings and pantograph sheave and cable linkage systems between the secondary counterweight and the outboard arm section.

In the continuing effort to reduce the cost of transporting the hundreds of millions of barrels of petroleum that are produced annually in remote areas of the world, marine supertankers as large as 150,000 dead weight tons with capacities of over one million barrels have been constructed, and vessels of even twice or more this size are in the design stages. Loading and unloading these huge ships must be carried out as quickly as possible, for every hour they are at wharfside can cost thousands of dollars. Marine loading arms, generally comprising a plurality of rigid tubular conduits pivotally interconnected by swivel joints and mounted upon an upright riser conduit along the side of the wharf or other mooring facility, are employed for this purpose. Though some of these arms have transfer capacities of considerably more than 25,000 barrels per hour, even when a "bank" of several are used simultaneously the time it takes to fill or empty one of these giant vessels is still far from satisfactory.

An additional problem involved with this type fluid transfer concerns the fact that the distance between the tanker's manifold and the point where the loading arm is mounted on the wharf fluctuates as the vessel moves in response to the tide and the change in cargo quantity, and in some locations can exceed 75 feet. This is a great distance for a loading arm to reach, and when flow capacity is also considered, the arm takes on giant proportions involving huge weights, yet balancing and maneuvering the arm in a safe manner is mandatory.

In order to meet these requirements, loading arms are now being designed and constructed with conduit diameters of 24 inches, and reaches of more than 85 feet. These arms can weigh 60 tons or more, and are counterbalanced on the riser so that they can be maneuvered. One highly successful counterbalancing system employs a primary counterweight for counterbalancing the inboard and outboard arm sections in all positions when the outboard section is in a vertical attitude, and a secondary counterweight linked to the outboard arm section through a pantograph mechanism comprising a pair of sheaves and an endless cable to counterbalance the outboard arm section in any attitude other than vertical. Although the wire rope conventionally used for the cable between the sheaves is satisfactory for arms of moderate size, it has been found inadequate for the greater weight of these larger arms. Furthermore, the distance between the sheaves in these large or long-reach arms is such that the cable sags excessively even though it is as taut as possible, and difficulties in installing or removing the cable are not uncommon.

A further problem associated with these huge arms is that of repacking or otherwise servicing the swivel joints. Dismantling the arm for this purpose is highly undesirable, for this requires extensive time and hoisting equipment, both of which are expensive. Although removable inserts for replacing the packings in certain swivel joints are known, these inserts increase the cost of the apparatus and can be difficult to handle.

SUMMARY OF THE INVENTION

The present invention solves the foregoing problems by providing a double counterbalanced loading arm with a chain and rod linkage between the sheaves in the pantograph system for the outboard arm section, a carriage and guide system for supporting this linkage so that it is taut yet does not restrict the arm's movement, and removable conduit sections at the swivel joints so that the joint packings can be serviced without having to disassemble the arm sections from each other. In addition, a manhole is positioned in the riser to provide access to the riser swivel for servicing its packing.

The carriage and guide system includes a wheeled carriage in rollable engagement with a track-like guide that is fixed to the inboard arm section generally midway between the pantograph sheaves. The chain and rod linkage is connected to the carriage, and as the linkage moves in response to rotation of the sheaves the carriage moves longitudinally along the guide, thus holding the linkage taut without impeding its movement.

The inboard arm section is supported on the riser through a system of struts and braces, and an elbow-shaped conduit is removably fastened between the inboard arm section and the trunnion swivel joint. The outboard arm section likewise is pivotally connected to the inboard section through a strut and brace system as well as a swivel joint, and another elbow-shaped removable conduit is positioned between the outboard arm section and this swivel joint. Thus, the trunnion swivel joint and the swivel joint between the inboard and outboard arm sections are convenient for servicing without having to disassemble the arm sections from each other.

BRIEF DESCRIPTION OF THE DRAWINGS

FIG. 1 is a view in side elevation of a double counterbalanced marine loading arm embodying the principles of the instant invention, showing the arm in its retracted or stowed position.

FIG. 2 is a view like FIG. 1, taken along the line 2–2 of FIG. 3, with the outboard arm section, the secondary counterweight, the hydraulic drive mechanism for the inboard arm section, and various associated bracing structure removed.

FIG. 3 is a view in rear elevation of the loading arm of FIG. 1.

FIG. 4 is an enlarged fragmentary view in vertical section taken along line 4–4 of FIG. 1 through the riser, riser swivel, and trunnion swivel, with the inboard section of the arm disposed horizontally and extending away from the viewer, and with a portion of the riser just above the riser swivel shown in full to illustrate the access plate for servicing this swivel.

FIG. 5 is an enlarged fragmentary view in rear elevation of the upper portion of the loading arm at the juncture of the inboard and outboard sections, showing the removable elbow and the bracing structure between the sections.

FIG. 6 is an enlarged fragmentary rear elevation of the carriage of FIGS. 1—3 for supporting the chain and rod linkage of the pantograph system, the view being taken looking in the direction of arrows 6–6 of FIG. 2.

FIG. 7 is a view in front elevation of the carriage of FIG. 6.

FIG. 8 is an enlarged fragmentary view in perspective of the carriage of FIGS. 6 and 7.

FIG. 9 is an enlarged fragmentary view in perspective of a modified form of carriage for the pantograph chain and rod linkage.

FIG. 10 is an enlarged fragmentary view in perspective of another modified form of carriage for the pantograph chain and rod linkage.

DESCRIPTION OF THE PREFERRED EMBODIMENT

Broadly considered, and as illustrated best in FIGS. 1 through 3, a double counterbalanced marine loading arm 20 embodying the instant invention comprises an upstanding riser 22, an inboard arm section 24, an outboard arm section 26, a terminal coupling assembly 28 for connecting the arm to a tanker's manifold, a primary counterbalancing assembly 30 for counterbalancing the arm in all positions while the outboard arm section is in a vertical attitude, and a secondary counterbalancing assembly 32 for counterbalancing the outboard arm section 26 when it is in an attitude other than vertical.

In the conventional manner, the riser 22 comprises a lower nonrotatable section 34 mounted on a wharf or other platform W and connected by a suitable conduit to a fluid reservoir or supply source (not shown), and an upper rotatable section 36 mounted on the lower section 34 by means of a swivel joint 38 that facilitates rotation of the section 36 about a vertical axis X. A pair of hydraulic cylinders 40 are mounted on a bracket 42 that is fixed to the rotatable riser section 36. A cable 44, extending from the piston rod 46 of one cylinder, wraps around and is fastened to rim 48 on the lower riser section 34 and connects to the piston rod of the other cylinder, thereby facilitating powered rotation of the upper riser section 36 and the loading arm attached thereto about the axis X.

As best illustrated in FIGS. 3 and 4, the inboard arm section 24 is mounted on the riser's upper section 36 for rotation about the horizontal axis Y by means of a trunnion swivel 50. A support structure comprising right and left-hand members 54, 56 (FIGS. 1—4), which for example could include longitudinal struts 54a, 54b, 56a, 56b, webs 54c, 56c, transverse braces 54d, 56d, and rearwardly extending beams 54e, 56e, respectively, is welded or otherwise fixed at its upper ends 54f and 56f, respectively, to the inboard arm 24. The members 54, 56 provide support for the primary counterweights 58a, 58b that are adjustably secured to the beams 54e, 56e, respectively, on opposite sides of the riser 22 so that the arm can be raised into the vertical position of FIG. 1 for more compact stowage. Near its longitudinal midpoint, the right-hand member 54 is mounted on the trunnion swivel 50 (FIG. 4) along with the inboard arm section 24, and similarly the left-hand member 56 is pivotally mounted on a second trunnion swivel 60 coaxial with the trunnion swivel 50. Thus, as the inboard arm section 24 is rotated about the axis Y, the members 54 and 56 rotate likewise about this axis by means of the swivels 50, 60. Further, it should be noted that the total weight of the loading arm elements borne by the swivels 50, 60 is substantially equally distributed between them.

Also, in the conventional manner, the outboard arm section 26 is connected to the inboard arm section 24 through a swivel joint 62 so that the outboard section can pivot with respect to the inboard section about a horizontal axis Z. A bracing structure 64 (FIGS. 3 and 5) extends from a rigid mounting 65 on the outboard arm section 26 to a pivotal mounting 66 on the inboard arm section 24, to provide support against lateral stresses that might tend to deflect the swivel joint 62 out of alignment.

The coupling assembly 28 can be of any suitable type, such as the conventional style illustrated best in FIG. 1. This particular coupling comprises a first elbow 68 connected by a swivel joint 70 to the end of the outer horizontally oriented portion 72 of the outboard arm section 26, a second elbow 74 connected to the first elbow 68 by means of a second swivel joint 76, and a terminal flange section 78 connected to the second elbow 74 by means of a third swivel joint 80, thus providing a universal joint-type connection between the arm and the manifold of the tanker or other marine vessel.

In order to maneuver the arm about the horizontal rotational axis Y, a power system such as that illustrated in FIG. 1 is preferably included in the apparatus. This power system 82 comprises a pair of single-acting hydraulic cylinders 84, 86 mounted on suitable supporting structure fixed to the inboard arm section 24, and a cable 88 extending from the piston rods of both cylinders and trained around and fixed to a sheave 90 that is rotatably mounted on the upper riser section 36 (FIG. 4). Thus, by extending or retracting the cylinder's piston rods, the inboard arm section 24 can be raised or lowered, thereby pivoting about the axis Y.

One important aspect of the present invention comprises the pantograph linkage system 100 between the outboard arm section 26 and the secondary counterbalancing assembly 32, which assembly includes a counterweight 92 and support beams 94, 96 (FIG. 4), for transferring the moment load imposed by the arm section 26 about the horizontal axis Z when it is in a position other than vertical, to the horizontal axis Y so that it can be counteracted by the assembly 32. This pantograph system 100 comprises an inner pair of sheaves 102, 104 (FIG. 4) rotatably mounted on the upper riser section 36 via swivels 106, 108, an outer sheave 110 (FIG. 2) fixed to the outboard arm section 26 but rotatable with respect to the inboard arm section 24, and a chain and rod assembly 112 interconnecting the inner sheaves 102, 104 with the outer sheave 110.

The counterweight support beams 94, 96 are fixed to the sheaves 102, 104, respectively, so that the counterweight 92 rotates with these sheaves about the axis Y simultaneously with rotation of the sheave 110 and outboard arm section 26 about the axis Z. A power system for rotating the sheaves 102, 104 comprises a double-acting hydraulic cylinder 97 pivotally mounted on a bracket 98 that is fixed to the upper riser section 36, and a strut 99 extending between and fixed to these sheaves. The cylinder's piston rod is pivotally connected to the strut 99, so that as the rod is extended or retracted the sheaves 102, 104 rotate clockwise or counterclockwise, respectively, as viewed in FIGS. 1 and 2.

The assembly 112 comprises an outer chain section 114 (FIG. 2) that is pinned or otherwise fixed against slippage on the sheave 110 by a fastening 116; an inner pair of chains 118, 120 (FIG. 3) trained around the sheaves 102, 104 respectively and likewise secured against slippage thereon by fasteners 122, 124; upper and lower outer rods 126, 128 (FIG. 2) connected to the upper and lower ends, respectively, of the chain 114; an upper inner pair of rods 130, 132 (FIG. 3) connected to the upper ends of the inner chains 118, 120 respectively; and a lower inner pair of rods 134, 136 (FIG. 2) connected to the lower ends of these chains 118, 120. Rods 126, 130 and 132 are pivotally linked together by means of a carriage 140, and in like manner the rods 128, 134 and 136 are pivotally connected through an identical carriage 142. Thus, it is seen that the chains 114, 118, 120, the rods 126, 128, 130, 132, 134 and 136, and the carriages 140, 142 functionally provide an endless and flexible linkage system between the inner sheaves 102, 104, and the outer sheave 110.

Because of the considerable length and weight of the assembly 112, it has been found very important to support its upper and lower flights 112a, 112b at a position approximately midway between the ends of the inboard arm section 24 in order to facilitate their installation and removal, as well as to provide a means for adjusting their tautness. This function is ideally performed by the carriages 140, 142 and their guides 144, 146 in which they travel. These guides are of generally channel-shape, as is seen from the illustration of guide 144 in FIGS. 7—10, and are fixed to the inboard arm section 24 in radial alignment with the outer sheave 110 by suitable supporting structure, such as a beam 148 rigidly mounted on the inboard arm section 24 by struts 149 (FIG. 3).

As best seen in FIGS. 6—8, each of the carriages 140, 142 (only 140 being shown) comprises a pair of generally triangular and parallel body plates 150, 152, two sets of inner rollers 154, 156 rotatably mounted on the plates 150, 152 by axles 158, 160, and a single set of outer rollers 162 also rotatably mounted on the plates 150, 152 by an elongated axle 164. The rod 126 is pivotally connected to the carriage 140 by means of a fitting 166 having a bore through which the axle 164 loosely passes. A pair of clevis connectors 168, 170 are pivotally mounted on the axle 164, and a pair of fittings 172, 174 that are fixed to the rods 130, 132, respectively, are pivotally joined to the connectors 168, 170, respectively, by pins 176, 178. Thus, the rods 130, 132 are capable of pivotal movement both laterally and vertically, as viewed in FIG. 8, with respect to the axle 164, and hence the carriage 140. Particularly with installations on large size arms, it may be desirable to reinforce the axis 164 with additional structure, such as gussets 180 that extend to the body plates 150, 152.

As is apparent from FIGS. 6, 7 and 8, the guide 144 within which the carriage travels is an elongated channellike structure with a lengthwise slot 184 to accommodate the carriage, and with tracklike flanges 186, 188. Of course, the dimensions of the guide 144 are such that the carriage will travel smoothly and freely along it without binding, and the size of the slot 184 is such that the body plates 150, 152 do not contact it. The guide flanges 186, 188 hold the inner rollers 154, 156, and thus the carriage 140, loosely and movably in the guide, thereby supporting the chain and rod assembly 112 without restricting its operation.

A modified version 190 of the carriage, illustrated in FIG. 9, comprises a pair of generally rectangular body plates 192, 194, a pair of inner roller sets 196, 198, and a single outer roller set 200. In this version the single rod 126a is pivotally connected to the rear corners of the body plates 192, 194 by a shaft 202. The second and third rods 130a, 132a are fixed to clevis brackets 204, 206 that are pivotally connected by pins 208, 210 to a transverse equalizing strut 212, which in turn is pivotally connected by a pin 214 to a clevis bracket 216, and the bracket 216 is pivotally mounted on the shaft 218 that is journaled in the plates 192, 194. Thus, the rods 130a, 132a, are also connected to the carriage 190 for pivotal movement both laterally and vertically with respect thereto, and further for movement in a longitudinal or axial direction by virtue of the pivotal mounting of the strut 212 through pin 214 on the bracket 216. This facility for longitudinal movement provides a means for equalizing any uneven tension on the rods 130a, 132a, which may occur if the sheaves 102, 104 are not exactly the same diameter.

The carriage 220, illustrated in FIG. 10, is a simplified version with primary utility on those loading arms of lesser size and/or weight. This carriage 220 comprises a single set of inner rollers 222 linked to a single set of outer rollers 224 by a body member 226. As in the carriage 140, an elongated axle 228 extends through the body portion 226 and the outer rollers 224, and provides at its outer ends a pivotal mounting for clevis connectors 230, 232 which are pivotally fastened through pins 234, 236 to fittings 238, 240 fixed to the rods 130b, 132b. The rod 126b is pivotally connected to the axle 228 via the fitting 242, so that the rods 130b, 132b, 126b have the same freedom of movement with respect to the carriage 220 as their counterparts in the carriage 140. Additional structural strength can be provided by including supporting members, such as the generally U-shaped gusset 244 fixed at either end to the axle 228.

Since it is difficult and expensive to manufacture sheaves 102, 104 in exactly the same diameter, especially when they are of the great size required on these huge loading arms, the equalizing strut 212 of the carriage 190 can also be employed with the carriages 140 and 220 by a clevis-type or other suitable connection between the strut and the carriage or the axle.

Another important facet of the instant invention is the provision for gaining access to the riser swivel joint 38, the trunnion swivel joint 50, and the swivel joint 62 between the inboard and outboard arm sections 24, 26 for servicing these elements and their packings without having to disconnect the arm sections from the riser or each other. This is facilitated by providing removable elbows 250, 252 in the conduit system of the loading arm. As seen in FIG. 4, the elbow 250 can be bolted or otherwise releasably secured at one end to the trunnion swivel 50, and at the other end to the main longitudinal section 254 of the inboard arm section 24, so that the elbow can be removed from the apparatus. The inboard arm support structures 54, 56 hold the inboard arm section in place with respect to the riser when the elbow 250 is removed. Likewise, as shown in FIGS. 1—3 and 5, suitable supporting structure such as struts 260, 262, gussets 264, and webs 266 can be provided between the sheave 110 and the outboard arm section 26 to hold the outboard arm section in place when the elbow 252 is removed.

The riser swivel 38 can be reached for replacing its packing 38a or otherwise servicing it without lifting the arm off the riser, by removing the cover plate 270 (FIG. 4) that is bolted or otherwise releasably secured to a manhole 272.

Although the best mode contemplated for carrying out the present invention has been herein shown and described, it will be apparent that modification and variation may be made without departing from what is regarded to be the subject matter of the invention as set forth in the appended claims.

I claim:

1. A fluid-transferring apparatus of the double counterbalanced marine loading arm type, including:
    1. an inboard arm section mounted upon an upstanding riser for pivotal movement about an inner generally horizontal axis;
    2. an outboard arm section connected to the inboard arm section for pivotal movement about an outer generally horizontal axis;
    3. a primary system for counterbalancing both inboard and outboard arm sections about said inner axis when the outboard arm section is in a substantially vertical attitude;
    4. a secondary pantograph type system comprising at least one inner sheave mounted on said riser for rotation about said inner axis, an outer sheave mounted on said outboard arm section for rotation therewith about said outer axis, and a flexible linkage interconnecting said sheaves for counterbalancing the outboard arm section about said outer axis; and
    5. a system for supporting and guiding said flexible linkage from a position intermediate the sheaves, said system comprising a generally elongated tracklike guide mounted on said inboard arm section and a carriage connected to said flexible linkage and rollably engaged with said guide for movement on said guide in a longitudinal direction.

2. The apparatus of claim 1 wherein said flexible lower flights, and wherein each of said flights is connected to a carriage.

3. A fluid-transferring apparatus of the double counterbalanced marine loading arm type, including:
    1. an inboard arm section mounted upon an upstanding riser for pivotal movement about an inner generally horizontal axis;
    2. an outboard arm section connected to the inboard arm section for pivotal movement about an outer generally horizontal axis;
    3. a primary system for counterbalancing both inboard and outboard arm sections about said inner axis when the outboard arm section is in a substantially vertical attitude;
    4. a secondary pantograph type system comprising two axially spaced inner sheaves mounted on opposite sides of said riser for rotation about said inner axis, an outer sheave mounted on said outboard arm section for rotation therewith about said outer axis, and flexible linkage between each of said inner sheaves and said outer sheave for counterbalancing the outboard arm section about said outer axis; and
    5. a system for supporting and guiding said flexible linkage from a position intermediate said inner and outer sheaves, said system comprising a generally elongated guide mounted on said inboard arm section and a carriage connected to said flexible linkage and held by said guide for movement on said guide in a longitudinal direction.

4. The apparatus of claim 3 wherein said flexible linkage describes an endless elongated loop with upper and lower flights, and wherein each of said flights is connected to a carriage.

5. The apparatus of claim 4 wherein there are two carriages, one connected to said upper flight and the other connected to said lower flight.

6. The apparatus of claim 5 including two guides, each guide holding one carriage.

7. The apparatus of claim 6 wherein both guides are mounted upon said inboard arm section by means of a common bracing structure.

8. The apparatus of claim 1 including a swivel pipe joint in said riser providing rotational movement of said apparatus about a generally vertical axis, and a manhole in said riser for gaining access to the inside of said swivel pipe joint from the outside of said riser for servicing said joint without removing said inboard arm section from said riser.

9. The apparatus of claim 1 including power means for pivoting said apparatus about said generally horizontal and vertical axes.

10. A fluid-transferring apparatus of the double counterbalanced marine loading arm type, including:
1. an inboard arm section mounted upon an upstanding riser for pivotal movement about an inner generally horizontal axis;
2. an outboard arm section connected to the inboard arm section for pivotal movement about an outer generally horizontal axis;
3. a primary system for counterbalancing both inboard and outboard arm sections about said inner axis when the outboard arm section is in a substantially vertical attitude;
4. a secondary pantograph-type system comprising at least one inner sheave mounted on said riser for rotation about said inner axis, an outer sheave mounted on said outboard arm section for rotation therewith about said outer axis, and a flexible linkage comprising a plurality of elongated rods interconnected by a plurality of lengths of roller-type chain, said flexible linkage interconnecting said sheaves for counterbalancing the outboard arm section about said outer axis; and
5. a system for supporting and guiding said flexible linkage from a position intermediate the sheaves, said system comprising a generally elongated guide mounted on said inboard arm section and a carriage connected to said flexible linkage and held by said guide for movement on said guide in a longitudinal direction, said rods being pivotally connected to said carriage through universal joint-type linkage means providing freedom for rod movement in two mutually perpendicular planes through the axis of said rod.

11. A fluid-transferring apparatus of the double counterbalanced marine loading arm type, including:
1. an inboard arm section mounted upon an upstanding riser for pivotal movement about an inner generally horizontal axis;
2. an outboard arm section connected to the inboard arm section for pivotal movement about an outer generally horizontal axis;
3. a primary system for counterbalancing both inboard and outboard arm sections about said inner axis when the outboard arm section is in a substantially vertical attitude;
4. a secondary pantograph-type system comprising at least one inner sheave mounted on said riser for rotation about said inner axis, an outer sheave mounted on said outboard arm section for rotation therewith about said outer axis, and a flexible linkage comprising a plurality of elongated rods interconnected by a plurality of lengths of rollertype chain, said flexible linkage interconnecting said sheaves for counterbalancing the outboard section about said outer axis; and
5. a system for supporting and guiding said flexible linkage from a position intermediate the sheaves, said system comprising a generally elongated guide mounted on said inboard arm section and a carriage connected to said flexible linkage and held by said guide for movement on said guide in a longitudinal direction, said rods being pivotally connected to said carriage for movement with respect thereto along the axes of said rods.

12. A fluid-transferring apparatus of the double counterbalanced marine loading arm type, including:
1. an inboard arm section mounted upon an upstanding riser for pivotal movement about an inner generally horizontal axis;
2. an outboard arm section connected to the inboard arm section for pivotal movement about an outer generally horizontal axis;
3. a primary system for counterbalancing both inboard and outboard arm sections about said inner axis when the outboard arm section is in a substantially vertical attitude;
4. a secondary pantograph-type system comprising at least one inner sheave mounted on said riser for rotation about said inner axis, an outer sheave mounted on said outboard arm section for rotation therewith about said outer axis, and a flexible linkage interconnecting said sheaves for counterbalancing the outboard arm section about said outer axis; and
5. a system for supporting and guiding said flexible linkage from a position intermediate the sheaves, said system comprising a generally elongated guide mounted on said inboard arm section and a carriage connected to said flexible linkage and held by said guide for movement on said guide in a longitudinal direction, said carriage comprising a main body portion, a first roller system rotatably mounted on said body portion, a second roller system rotatably mounted on said body portion and spaced from said first roller system, a generally elongated transverse member connected intermediate its ends to said body portion, and means for connecting said body portion and said transverse member to said flexible linkage.

13. The apparatus of claim 12 wherein said first roller system comprises a pair of rollers mounted on opposite sides of said body portion.

14. The apparatus of claim 12 wherein said second roller system comprises a pair of rollers mounted on opposite sides of said body portion.

15. The apparatus of claim 12 wherein first roller system comprises at least two pairs of rollers, one roller of each pair mounted on the opposite side of said body portion from the other rollers.

16. The apparatus of claim 12 wherein said transverse member is rigidly fixed to said body portion.

17. The apparatus of claim 12 wherein said transverse member is pivotally mounted on said body portion.

18. The apparatus of claim 12 wherein said transverse member is mounted on said body portion for pivotal movement with respect thereto about mutually perpendicular axes, one of said axes being generally normal to the direction of longitudinal movement of said carriage in said guide.

19. The apparatus of claim 12 wherein there are two inner sheaves coaxially mounted on opposite sides of said riser, and a separate flexible linkage length trained around each of said inner sheaves and connected to opposite ends of said transverse member.

20. The apparatus of claim 19 wherein said flexible linkage lengths are connected to said transverse member for pivotal movement with respect thereto.

21. The apparatus of claim 19 wherein said flexible linkage lengths are connected to said transverse member through universal joint-type means.

22. A fluid-transferring apparatus of the double counterbalanced marine loading arm type, including:
1. an inboard arm section mounted upon an upstanding riser for pivotal movement about an inner generally horizontal axis;
2. an outboard arm section connected to the inboard arm section for pivotal movement about an outer generally horizontal axis;
3. swivel pipe joint means interconnecting said riser and said inboard arm section and interconnecting said inboard and outboard arm sections, fluid conduit means removably attached to said swivel pipe joint means and said inboard and outboard arm sections, and bracing structure interconnecting said riser and said inboard arm section and interconnecting said inboard and outboard arm sections such that said fluid conduit means can be removed from said apparatus without disconnecting said riser, inboard and outboard arm sections from each other;
4. a primary system for counterbalancing both inboard and outboard arm sections about said inner axis when the outboard arm section is in a substantially vertical attitude;
5. a secondary pantograph-type system comprising at least one inner sheave mounted on said riser for rotation about said inner axis, an outer sheave mounted on said outboard arm section for rotation therewith about said outer axis, and a flexible linkage interconnecting said sheaves for counterbalancing the outboard arm section about said outer axis; and 6. a system for supporting and guiding said flexible linkage from a position intermediate the sheaves, said system comprising a generally elongated guide mounted on said inboard arm section and a carriage connected to said flexible linkage and held by said guide for movement on said guide in a longitudinal direction.

UNITED STATES PATENT OFFICE
CERTIFICATE OF CORRECTION

Patent No. 3,556,148   Dated August 11, 1971

Inventor(s)

It is certified that error appears in the above-identified patent and that said Letters Patent are hereby corrected as shown below:

Column 6, line 31, after "flexible" insert --linkage describes an endless elongated loop with upper and--. Column 8, 27, after "wherein" insert --said--.

Signed and sealed this 2nd day of November 1971.

(SEAL)
Attest:

EDWARD M. FLETCHER, JR.　　　　　　ROBERT GOTTSCHALK
Attesting Officer　　　　　　　　　Acting Commissioner of Pate